Oct. 8, 1968 J. RAITI 3,404,470

AUTOMOTIVE TRUCKS USED BY STREET AND HIGHWAY DEPARTMENTS

Filed Oct. 20, 1965 6 Sheets-Sheet 1

INVENTOR
James Raiti
BY Polachek & Saulsbury
ATTORNEYS

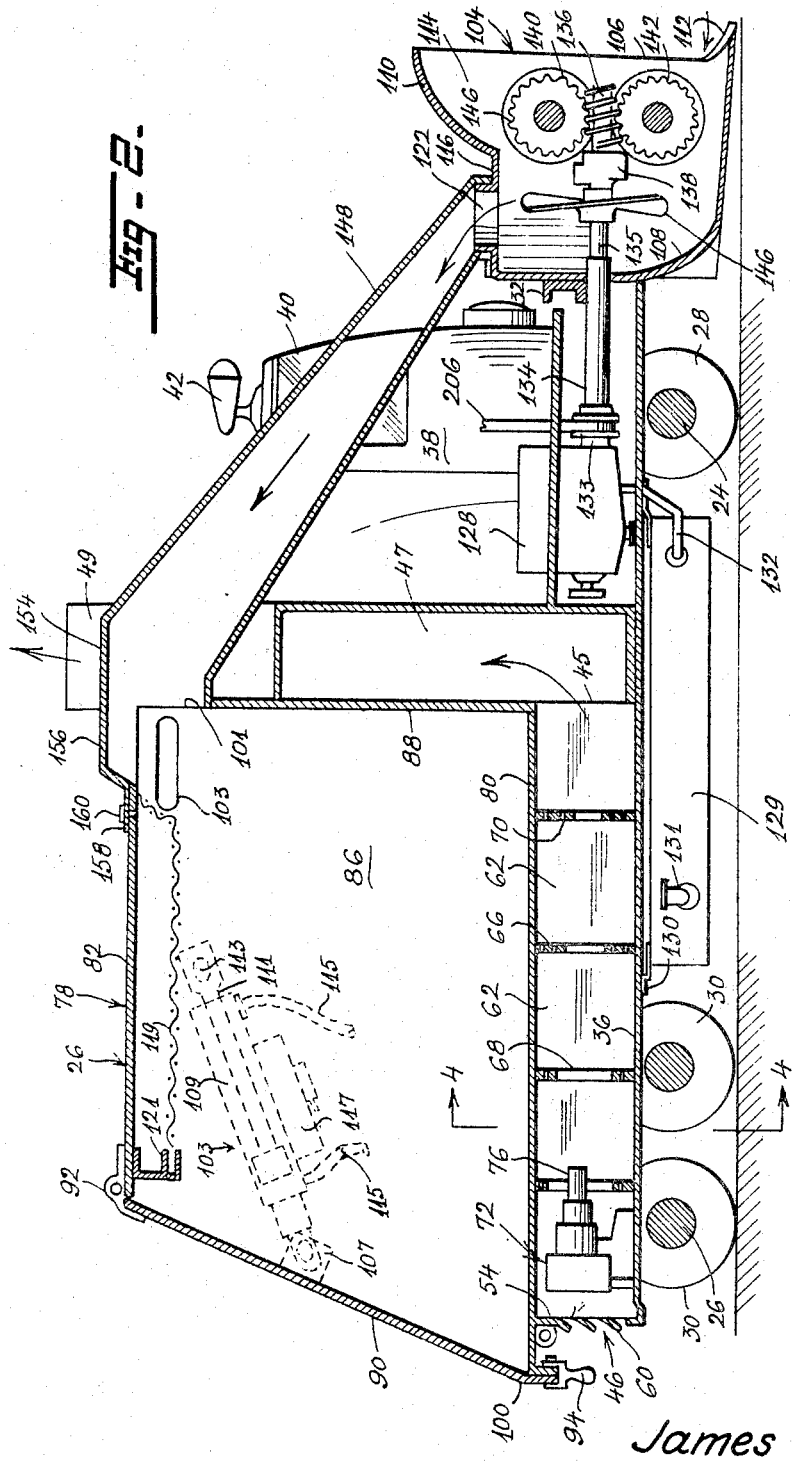

Oct. 8, 1968  J. RAITI  3,404,470
AUTOMOTIVE TRUCKS USED BY STREET AND HIGHWAY DEPARTMENTS
Filed Oct. 20, 1965  6 Sheets-Sheet 3
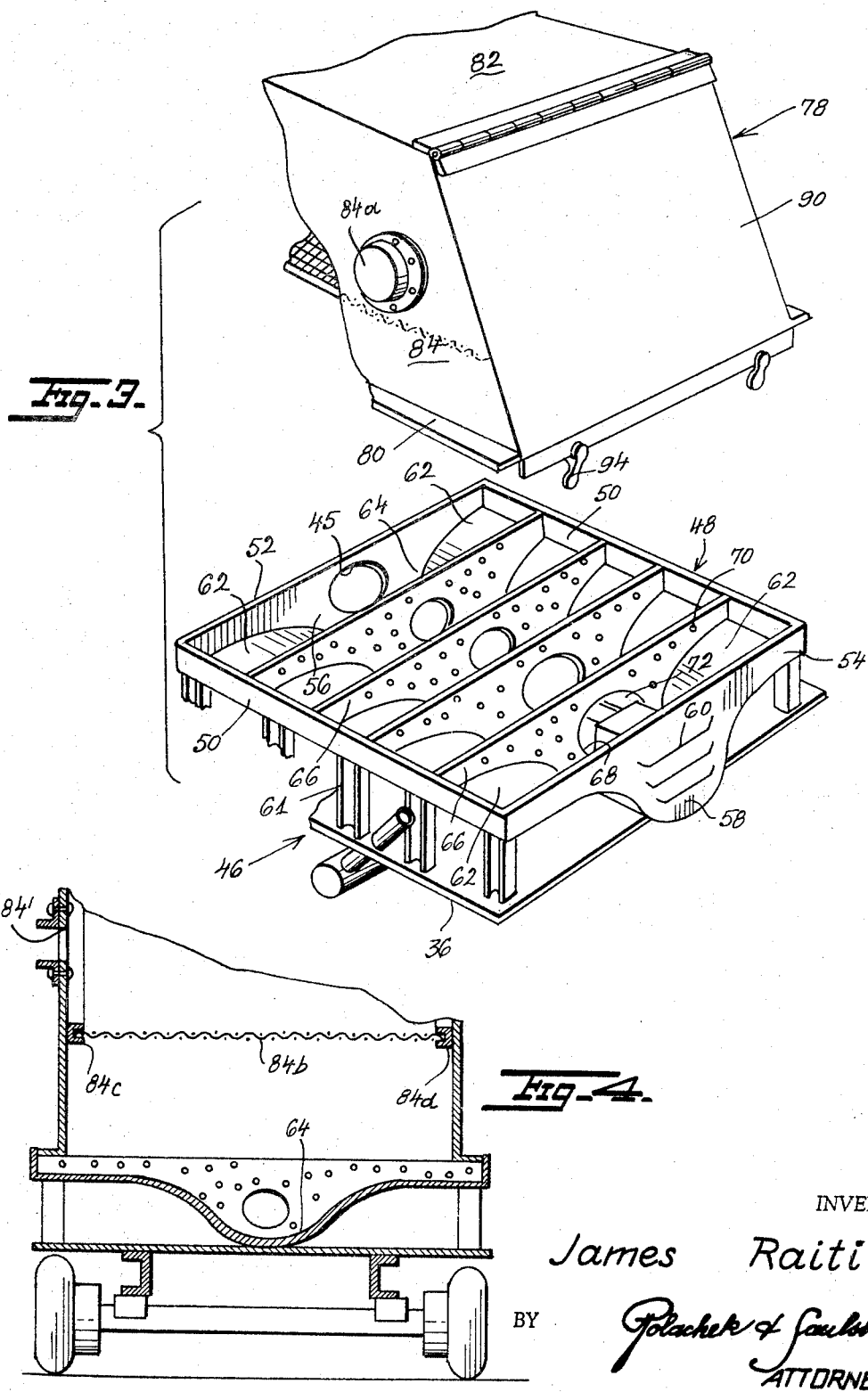
INVENTOR
James Raiti
BY Polachek & Saulsbury
ATTORNEYS Oct. 8, 1968  J. RAITI  3,404,470
AUTOMOTIVE TRUCKS USED BY STREET AND HIGHWAY DEPARTMENTS
Filed Oct. 20, 1965  6 Sheets-Sheet 4
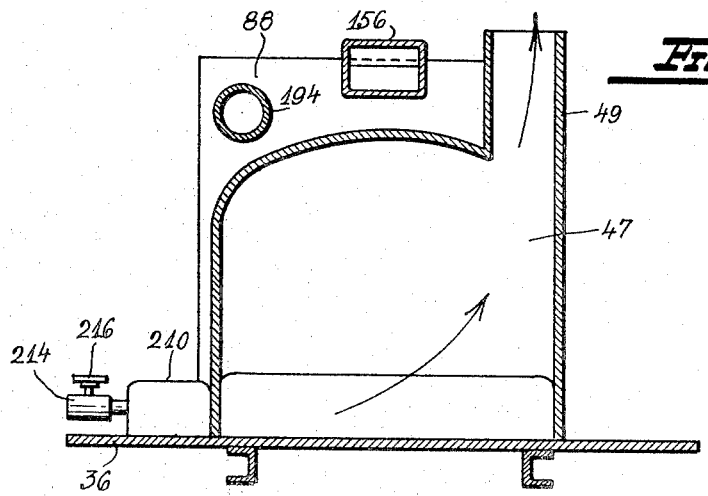
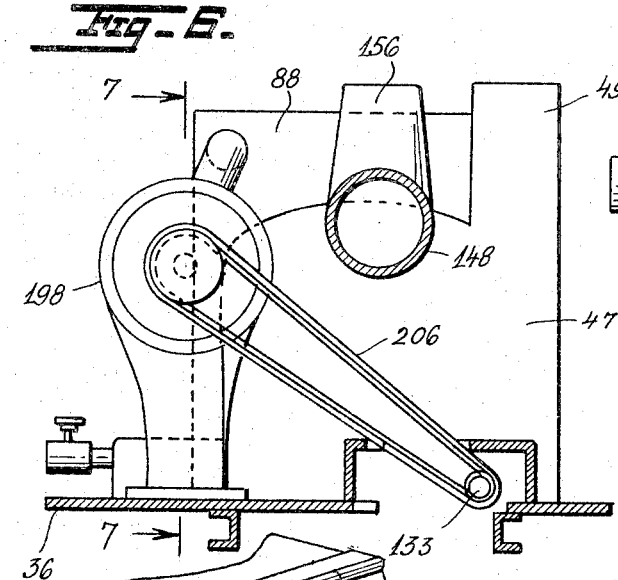
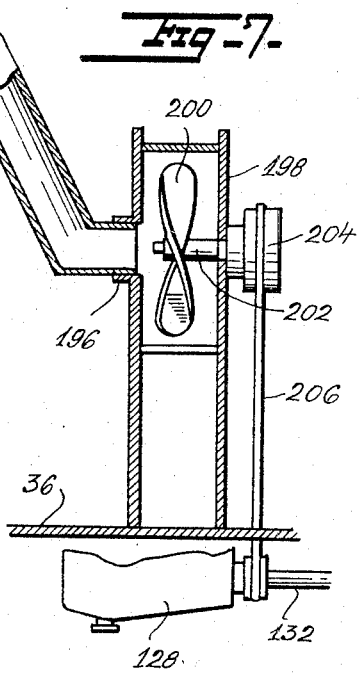
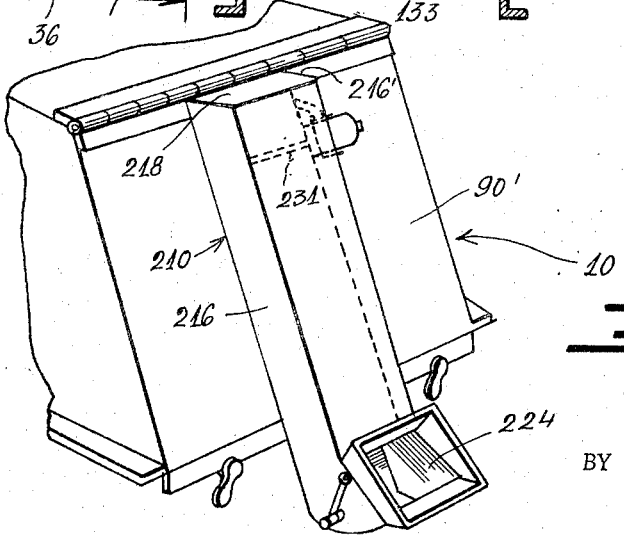
INVENTOR
James Raiti
BY
Polachek & Saulsbury
ATTORNEYS

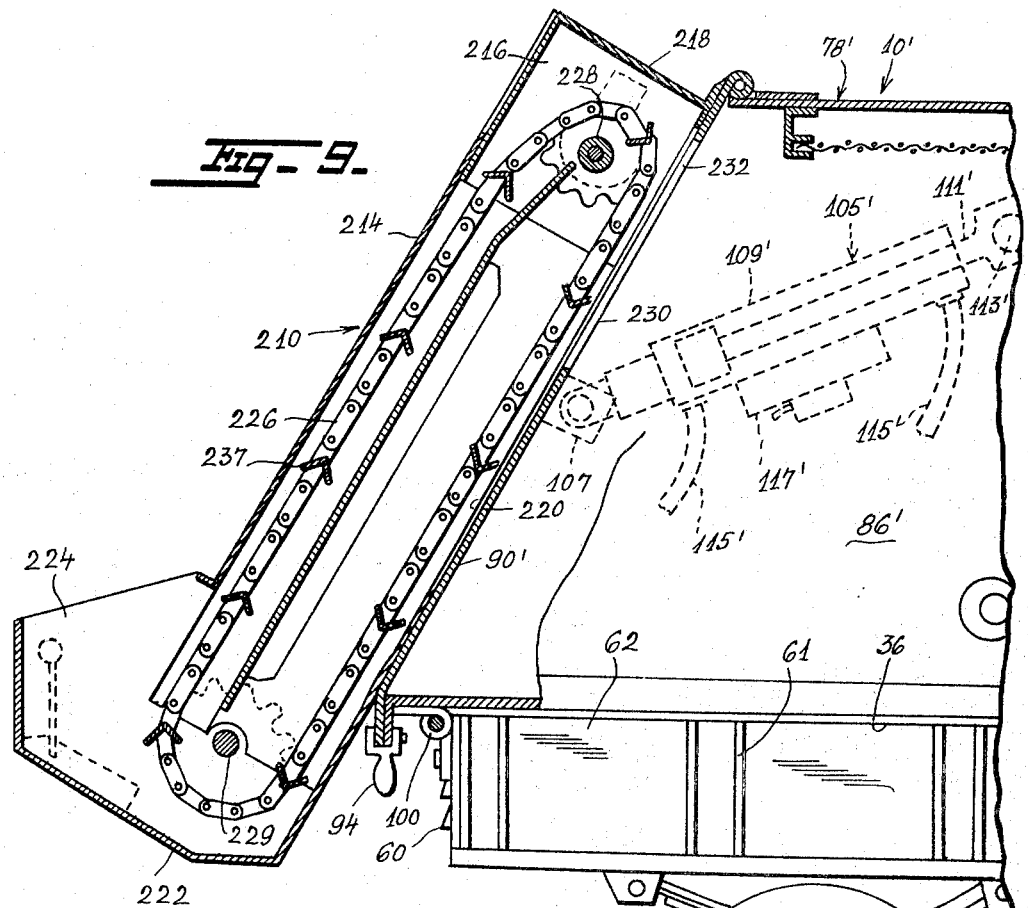

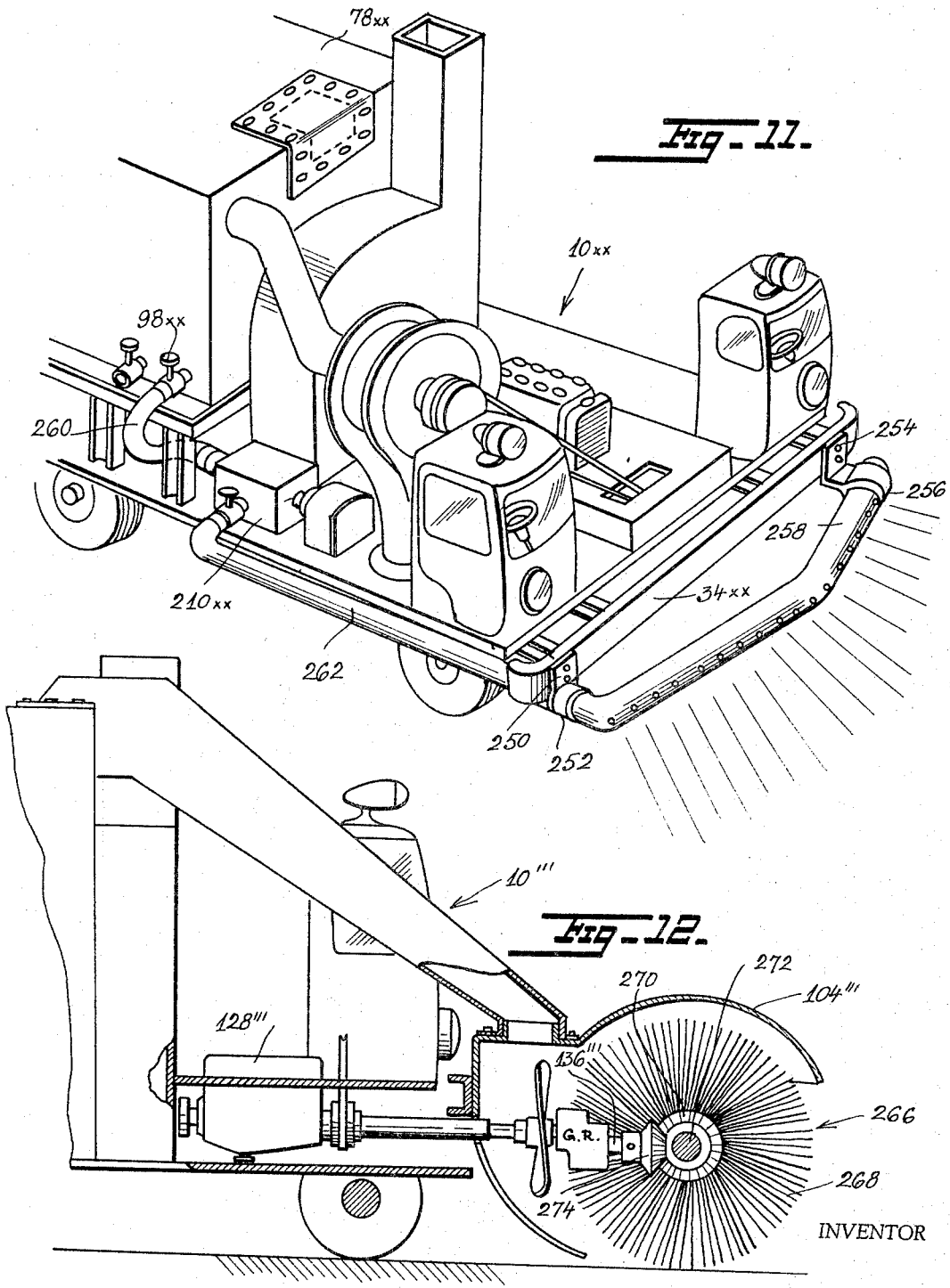

United States Patent Office 3,404,470
Patented Oct. 8, 1968

3,404,470
AUTOMOTIVE TRUCKS USED BY STREET AND HIGHWAY DEPARTMENTS
James Raiti, Woodside, N.Y.
(11 Curtis Place, Lynbrook, N.Y. 11563)
Filed Oct. 20, 1965, Ser. No. 498,310
2 Claims. (Cl. 37—12)

This invention relates generally to automotive trucks. More specifically it relates to trucks of the type used by street and highway departments of most municipalities.

It is generally well known that most communities are obliged to maintain through heavy taxation a large fleet of trucks of various types for performing various highway and street duties such as shoveling of snow and the removal thereof, the collection of refuse, the sweeping of streets, the sprinkling thereof, the cleaning out of sewers. Each of these duties is accomplished by a specifically designed truck intended for doing the singular job in a most efficient manner. The cost to the municipality to purchase and maintain so large a variety of trucks is enormous, and this objectionable feature can be further appreciated when it is realized, that most of the time only one type of these vehicles is in actual use, while the other types remain idle, thereby tieing up municipal funds which could be used for other purposes or keeping taxes down. Accordingly such a situation is not ideal.

Accordingly, it is an object of the present invention to provide an all purpose municipal truck having self contained means for performing a variety of tasks such as the shoveling of snow and removal thereof, the collection of refuse, and sweeping of streets, the sprinkling thereof, and the cleaning out of sewers, thereby eliminating the need of a large fleet of trucks.

Another object of the present invention is to provide an all purpose truck having self contained means to melt the snow, which is shoveled up thereby, and transport the same away in a melted state whereby a larger volume of snow can be thus carried away on one truck load than would be possible if it were transported in an unmelted condition.

Still another object of the present invention is to provide an all purpose truck wherein certain parts and mechanisms are used in several of the different tasks, thereby not requiring the addition of a complete singular mechanism for each one of the tasks.

A still further object of the present invention is to provide an all purpose truck which is readily and easily convertible from performing one task to performing another.

Other objects are to provide an all purpose truck which is relatively simple in design, relatively inexpensive to manufacture, rugged in construction, easy to use, and effective and efficient in operation.

These and other objects will be readily apparent upon a study of the following specification and the accompanying drawings wherein:

FIG. 2 is a vertical sectional view taken on the line 2—2 of FIG. 1.

FIG. 3 is a disassembled perspective view of the hinged door and heater chamber.

FIG. 4 is a vertical sectional view taken on the plane of the line 4—4 of FIG. 2.

FIG. 5 is a vertical sectional view taken on the plane of the line 5—5 of FIG. 1.

FIG. 6 is a vertical sectional view taken on the plane of the line 6—6 of FIG. 1.

FIG. 7 is a vertical sectional view through the fan housing.

FIG. 8 is a perspective view of the rear of the truck in use in cleaning a sewer.

FIG. 9 is a vertical sectional view through the rear of a truck embodying a modified form of the invention.

FIG. 10 is a rear view of the truck shown in FIG. 9.

FIG. 11 is a fragmentary perspective view of the front of a truck embodying another modified form of the invention.

FIG. 12 is a part elevational and part sectional view of the front of a truck embodying still another modified form of the invention.

Figure 1:
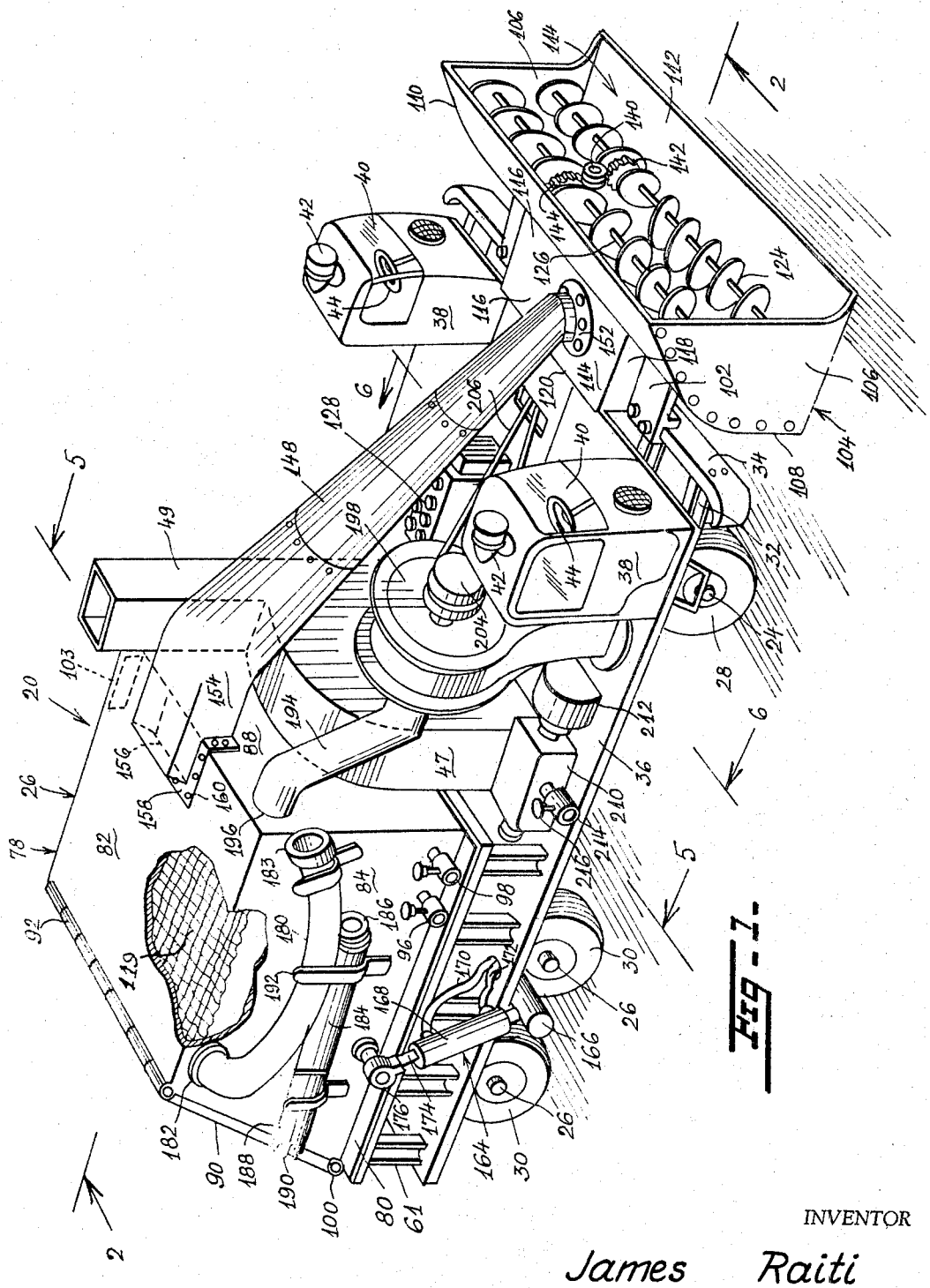
FIGURE 1 is a top perspective view of an automotive truck embodying one form of the invention, shown equipped for snow shoveling duty.

Referring to the various views of the drawings in detail, in FIG. 1 there is shown an all-purpose municipal automotive truck made in accordance with the invention and designated generally at 20. The truck 20 includes a chassis mounted upon front and rear axles 24 and 26, respectively, supporting front and rear road wheels 28 and 30, respectively. The chassis includes longitudinally-extending beams 32 supported on the axles, and cross members including a front fender 34 connecting the ends of the beams 32.

A flat platform 36 of wood is supported on the longitudinally-extending beams 30 and extends the length thereof. The platform 36 supports the various mechanisms and instrumentalities provided on the truck.

A pair of cabs 38, 38 is mounted on the front corners of the platform 36, over the front wheels 28, 28 each cab including windows 40, a headlight 42 on the top thereof, a seat, not shown, and a steering wheel 44.

Rearwardly of the chassis 22 over the rear rod wheels 26, 26, a heater chamber 46 is supported on the platform 36. Referring particularly to FIG. 3, the heater chamber 46 comprises a rectangular frame 48 including rectangular shaped side bars 50, 50 and end bars 52 and 54 having downwardly extending curved extensions 56 and 58, respectively, the extension 58 being formed with fluted openings 60. The side bars 50 are supported on the platform by means of pairs of upright posts 61 spaced from each other. Across the frame and inside the same, there are strips 62 rectangular in plan, with their midend portions dipped as indicated at 64 and supported on the platform, 36. The strips are closely spaced from each other, and disposed in the spaces between the strips there are plates 66 seated on the platform 36 as seen in FIG. 2. The plates have aligned holes 68 midway the ends thereof in line with the dips in the strips 62. The holes are of various sizes, getting smaller in dimension from the wall 66 adjacent end bar 54. The bodies of the plates 66 are formed with smaller perforations 70. An automatically controlled oil burner 72 is shown diagrammatically in FIG. 2 supported on platform 36 at the rear of the chamber 46, with its flame nozzle 76 extending through the hole 68 in rearmost partition plate 66, for blowing hot air through the holes and perforations in the plates 66 into the chamber heater 46. The perforated plates serve as flame diffusers. The front end plate 52 of the heater chamber 46 is formed with an outlet 45 which communicates with a muffler compartment 47 formed with an upstanding chimney 49, communicating with the atmosphere in order to direct the products of combustion into the atmosphere.

A substantially square-shaped tank 78 is pivotally mounted on the top of the frame 48 of the heater chamber 46. The tank includes a bottom wall 80, top wall 82, side walls 84 and 86 and front wall 88 as viewed in FIG. 1. The rear of the tank is open, with the rear edges of the side walls tapering, and is closed by a door 90 hingedly secured along its top edge to the rear edge of the top wall by a hinge structure 92. The door is adapted to be interlocked to the rear of the bottom wall 80 by means of a latching device 94. The tank 78 is provided at its front end near the bottom, with a valve-controlled inlet 96 and a valve-controlled drainage outlet 98. The rear end of the tank is hingedly connected to the top of the plate 52 of the heater chamber 46 by a hinge structure 100. An inlet opening 101 is formed in the tank 78 intersecting the top and rear walls 82 and 88, and a breather opening 103 is formed in the side wall 86 adjacent the inlet opening 101.

A hydraulic cylinder unit is pivotally supported at one end on the outside of one side wall of the tank, the side wall 86, the other end of the unit being pivotally connected to a block 107 fastened to the inner surface of the door 90 of the tank. The cylinder unit includes a cylinder 109 pivotally connected to the bearing block 107 and a piston 111 secured to a pivot pin 113 fastened to the side wall 86. A hydraulic line 115 is connected to opposite ends of the cylinder 109, the line being shown broken, and a hydraulic pump 117 is shown in the line 115 which can be electrically powered by controls. A screen 119 is supported adjacent the top wall 82 by a bracket 121 at one end and by the top wall at the other end.

In accordance with the invention, mechanism for removing and collecting snow, leaves and the like is mounted on the chassis 22 forwardly of the front cross member 34 thereof and is fastened to said cross member by a bracket 102 riveted to the cross member. A hopper structure 104 is supported on the front of the bracket 102 and includes side walls 106, 106, rear wall 108, curved top wall 110, and flat bottom wall extending forwardly of the side walls and serving as a snow shovel or scraper 112. The front of the hopper is open, constituting a wide mouth 114 to receive snow, leaves and other solid substances. At its center the rear wall 108 is formed with an integral extension forming a fan chamber 114 mounted on the bracket 102. The fan chamber has a flat top wall 116, side walls 118, rear wall 120 and is open at the front communicating with the interior of the hopper. A tubular outlet opening 122 is formed in the center of the top wall 116.

A pair of snow augers 124 and 126 of screw configurated design, in vertical spaced alignment, is rotatably supported by the side wall 106, inside the hopper. Each auger includes a right hand threaded portion for one-half its length and a left-hand threaded portion for the other half in order to draw snow toward the center thereof after the auger has cut into a bank of snow.

The augers 124 and 126 are driven by a combustion engine 128 mounted on the platform 36 to one side of the center thereof rearwardly of the cabs 38. An oil supply tank 129 is mounted on brackets 130 underneath the platform 36 adjacent the engine 128. The tank is provided with an inlet 131 and a pipe 132 supplying oil to the engine. The engine drive shaft 133 is connected to a driven shaft 134 extending through an opening in the rear wall 108 of the hopper 104 into the hopper, and a shaft 134 drives another shaft 135 extending across the interior of the hopper and operatively connected to another shaft 136 by means of reduction gearing indicated diagrammatically at 138. A worm 140 is formed on the shaft 136 and is in mesh with worm gears 142 and 144 on the augers 124 and 126, respectively. A snow blowing propeller or fan 146 is fixed on shaft 134 in the hopper. An elongated tubular duct 148 connects the top of the hopper 104 with the top of the tank 78. This connection includes a circular flange 152 on the end of the duct adjacent the hopper fitted over the outlet 122 in the extension of the hopper. The other end of the duct is formed with a head portion 154 fitted over the inlet opening 101 in the top end front of the tank 78. The head is formed with an extension 156 fitting over the remainder of the inlet opening and secured to the top wall 82 by a perforated flange 158 and rivets 160.

When the truck 10 is used for collecting and disposing of snow, the oil burner is turned on and the flame from the nozzle 76 enters the heater chamber 46, passing through the holes 68 and perforations 70 in the plates 66 and is deflected by the solid portion of the plates 66. The plates serve as diffusers and deflectors. The flame heats the bottom wall 80 of the tank. Snow is gathered and collected by the augers 124 and 126 and forced through the hopper out through the outlet 122 into the duct 148 and is forced upwardly through the duct by the fan 146 through the inlet 101 into the tank 78. The heated bottom wall 80 of the tank causes the snow to melt when it reaches the bottom wall in the tank. After sufficient snow is thus collected and melted, the truck is driven toward a convenient sewer where the water is poured out of the tank through a valve-controlled outlet 98, near the bottom wall of the tank.

Mechanism is provided for pivoting lifting the tank 78 off of the frame 48 of the heater chamber 46 when it is necessary to clean out the tank or clean or check the heater chamber 46. For this purpose, a hydraulic pump assembly 164 is supported at one end on a cylindrical bearing member 166 extending laterally from under the platform 36 and includes a cylindrical casing 168 containing fluid supplied by pipes 170 and 172 leading to a supply of fluid and a piston 174 forced upwardly by the fluid. The top end of the piston is pivotally connected to a laterally extending bearing member 176 on the side wall 84 of the tank 78. When the hydraulic pump is operated, the piston 174 pushes the tank upwardly on its hinge structure 100 away from the heater chamber 46 the forward portion of the apparatus on the tank being suitably disconnected.

The truck carries equipment for the periodic pumping out of mud and muck collected in street sewers which if left unattended would in time clog the system of the sewer. At the present time, in most communities this is accomplished by slow manual methods or by electrically powered buckets having claws to grasp the mud and raise it out of the sewer a bucketful at a time.

For this purpose, according to an important feature of the present invention, an elongated flexible hose 180 is provided, one end of which is fitted in an inlet opening 182 in the side wall 84 of the tank 78 and the other free end is provided with a threaded ring 183. Another shorter hose 184 is provided with a threaded ring 186 at one end for connection to the hose 180. An aluminum mud nozzle 188 is carried on the other end of the hose 184, which nozzle is formed with a toothed terminal 190, which is adapted to be placed into the sewer 185 after the manhole cover 187 is removed as shown in FIG. 8. Hose 180 and hose 184 are removably supported on brackets 192 secured to side wall 84 of the tank.

It is advantageous that the air pressure within the tank 78 be relatively low so that vacuuming of the sewer is also made possible. For such operation, a special duct 194 has one end connected to an inlet opening 196 in the front wall 88 of the tank 78. The other end of the duct extends into an outlet in a fan housing 198 mounted on the platform 36. A high speed fan 200 is mounted on the end of a shaft 202 horizontally disposed in the housing and connected to a pulley 204 outside the housing which is driven by a belt 206 connected to the shaft 132 of engine 128.

An air pump 210 is mounted on the platform 36 midway its ends at one side thereof, which pump is actuated by a motor 212 supported adjacent thereto. The pump is provided with an outlet 214 with control valve 216, for connecting various instrumentalities thereto.

The present invention contemplates a modified form of truck equipped for collecting garbage. Such a truck is shown in FIGS. 9 and 10 wherein the rear end of a truck 10' embodying such equipment is shown. For this purpose, a garbage collection unit 210 is shown attached to the rear door 90' of the truck and secured thereon by welding or in any other suitable manner. The unit comprises an elongated rectangular-shaped casing extending the length of the door and therebelow, centrally of the door. The casing constitutes a duct and includes a front wall 214, side walls 216, top wall 218, a back wall 220 and a bottom wall 222. The bottom wall 222 and side walls 216 extend forwardly and the front wall extends forwardly and upwardly, said forwardly extending wall portions being separated forming a wide mouth hopper 224 to receive the garbage.

The garbage is dumped into the hopper 224 where an endless belt 226 mounted over upper and lower sprocket wheels 228 and 229, respectively, mounted on upper and lower shafts, respectively, carries the garbage upwardly where it is dumped through aligned openings 230 and 232 in the back wall 229 of the unit casing and the door 90', respectively, into the tank 78'. The upper shaft is operatively connected to the shaft of a motor supported on the unit 210 by brackets, the motor thus providing power to rotate the belt. Cleats 237 on the belt aid to grasp the garbage and carry it upwardly. A hydraulic cylinder unit 105' similar to unit 105 of FIG. 2 is mounted on the side wall 86' and is similarly numbered with primes added. This hydraulic unit is adapted to lift the door 90' and unit 210.

In FIG. 11, a truck 10xx modified for street sprinkling is shown. In truck 10xx, a bracket 250 is riveted to the fender 34xx at one end with a tubular bearing 252 supported thereby and opening forwardly. Another bracket 254 is riveted to the other end of the fender and supports an integral tubular member 256 opening laterally. An elongated perforated pipe 258 extends between the tubular members with its ends fitted in the bearings. The pipe extends forwardly of the chassis.

A hose 260 is connected between the outlet 98xx of the tank 78xx and the pump 210xx. The tank 78xx contains the water for sprinkling. An elongated pipe 262 extends from the pump to the fender 34xx with one end connected to the outlet of the pump and its other end connected to the tubular bearing 252, supported by the fender.

In operation, the valve on the outlet 98xx of the tank is opened and then the valve on the pump outlet 216xx, causing water in the tank to be forced under pressure through pipe 262 into the perforated pipe 258, which serves as a spray head. The pipe 258 is designed to flush roadway dirt by being directed in a generally horizontal direction relative to the road surface.

In FIG. 12, another modification of the invention is shown constituted by a truck 10''' especially equipped for sweeping streets. The truck 10''' differs from truck 10 in that in place of the augers 124 and 126 a large broom 266, circular in cross-section is rotatably supported in the hopper 104''' with its bristles 268 engaging the ground. The broom is driven by a gear 270 fixed on the shaft 272 supporting the bristles, which gear is in mesh with a beveled gear 274 fixed on the shaft which is operatively connected to the engine 128'''.

While the hopper structure 104 is shown rigidly attached to the front cross member 34, it is to be understood that an elevating of the hopper structure 104 relative to the cross member could be effected by elevating means mounted on the chassis and connected to the hopper structure to lift the hopper structure relative to the truck chassis.

Further, it should be understood that the oil burner 72 while located at the rear of the truck can be located at any position from that shown forwardly or rearwardly thereof as to best effect the heating of the bottom wall 80 of the tank. If great heat is required, the nozzle 76 and the burner 72 may be moved remotely from the bottom wall and rearwardly thereof. It can even be mounted on the back of the wall 54 with the nozzle penetrating the wall 54 by three or four inches. The plates 66 while shown solidly connected between the side bars 50 may be connected releasably so that they can be removed upon being burned and replaced by new plates 66.

The two forward wheels 28 are steerable wheels. It shall be understood that because of the heavy weight on the forward part of the truck that further support wheels can be located behind the steerable wheels in order to take care of the excess weight for this type of equipment.

The cab 38 from which the truck is steered has contained therein the engine for driving the truck along the road and can be connected by any suitable transmission and gearing to either the steerable wheels 28 or to wheels which can be positioned just rearwardly thereof. The wheels 30 at the rear of the truck do not need to be connected to the engine to be driven. It will be further understood that the drive engine can be located on the truck removed from the cab at any suitable location thereof.

In FIGS. 3 and 4 there is shown a screen arrangement inside of the tank for use when the truck is being used for collecting and melting snow. It is necessary to protect the drain opening 84' normally closed by a cap 84a from trash material that is collected when the snow is elevated into the melting tank. This screen is located generally at 84b and is fitted into the slotted rails 84c and 84d at the opposite sides of the tank. These rails are curved from the rear upwardly and forwardly so that the forward edge will engage the top end 82 of the tank just rearwardly of the opening 101.

From the cab at the left hand side of the truck the driver of the truck can control the operation of the garbage collecting equipment and the sprinkler system, while the operator in the cab 38 on the right hand side can control the snow removal and melting equipment of the catch basin.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. In an automotive truck, the combination of a chassis, a cab, a truck body supported on said chassis, said chassis being supported on wheels and said chassis and truck body carrying mechanism for removal of snow and melting the same comprising a main frame, a platform mounted on said main frame, a heater chamber mounted on said platform at the rear thereof, a tank mounted on said heater chamber, said tank having an inlet opening at the top thereof, a hopper supported at the front of the chassis forwardly of the wheels, said hopper having an outlet opening in the top thereof, a duct having one end connected to the inlet opening in the tank and its other end operatively connected to the outlet opening in the hopper, an engine mounted on the platform and mechanism in the hopper operatively connected to the engine for collecting and forcing snow through the hopper and duct to the tank, said heater chamber including a plurality of longitudinally spaced strips defining partitions extending transversely across the chamber, said strips being dipped at the centers thereof to form an upwardly concave portion, vertical plates positioned in the spaces between the strips, said strips forming the bottom wall of said tank, said plates having perforated bodies and relatively enlarged aligned central openings, and an oil burner in the chamber at one end thereof, said burner having a nozzle directed at the aligned central openings in the plates, said chamber having an exhaust chamber at one end of said tank.

2. The automotive truck as defined in claim 1, said mechanism including a pair of auger devices rotatably supported in vertical alignment in the hopper, each auger device including a shaft and right and left hand screw elements thereon, opposed worm gears on the shafts, a shaft operatively connected to the engine, and a worm on said shaft in mesh with the gears whereby said auger devices are rotated, and a fan fixed on said shaft.

References Cited

UNITED STATES PATENTS

| 2,728,336 | 12/1955 | Elgeti | 126—343.5 |
| 3,066,428 | 12/1955 | Raiti | 37—12 |
| 3,098,478 | 7/1963 | Philbrook | 126—343.5 |
| 3,353,286 | 11/1967 | Marks | 37—12 |

ABRAHAM G. STONE, *Primary Examiner.*

J. W. PETERSON, *Assistant Examiner.*